(12) United States Patent
Sakai

(10) Patent No.: US 7,733,748 B2
(45) Date of Patent: Jun. 8, 2010

(54) OPTICAL DISK APPARATUS METHOD FOR COMPENSATING RECORDING POWER FOR THE SAME

(75) Inventor: Hiroharu Sakai, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 446 days.

(21) Appl. No.: 11/851,434

(22) Filed: Sep. 7, 2007

(65) Prior Publication Data

US 2008/0112286 A1    May 15, 2008

(30) Foreign Application Priority Data

Nov. 15, 2006    (JP) ............................. 2006-309423

(51) Int. Cl.
*G11B 7/00* (2006.01)
(52) U.S. Cl. ................ 369/44.32; 369/59.19; 369/47.5; 369/47.11
(58) Field of Classification Search .................. None
See application file for complete search history.

(56) References Cited

U.S. PATENT DOCUMENTS 6,975,574 B2 * 12/2005 Yanagawa et al. ........ 369/53.19
7,102,975 B2 * 9/2006 Sakai et al. .............. 369/53.31

FOREIGN PATENT DOCUMENTS

| JP | 2004-234703 | 8/2004 |
| JP | 2005-004873 | 1/2005 |
| JP | 2005-276248 | 10/2005 |

* cited by examiner

*Primary Examiner*—Muhammad N. Edun
(74) *Attorney, Agent, or Firm*—Antonelli, Terry, Stout & Kraus, LLP.

(57) ABSTRACT

In a method for compensating recording power, being suitable for an optical disk apparatus, applying the WOPC therein, as a means for compensating recording power during recording operation, and also an optical disk apparatus applying the same therein, wherein the recording operation is interrupted, when a predetermined amount of data is recorded continuously, to determine the recording power for when recoding next, from the recoding condition onto the optical disk just before interruption thereof, and thereby starting the recording, with the recording power determined from that just after said interruption thereof, wherein an adjustment is made on a tilt angle of an optical pickup when the recording power, which is determined when interrupting the recording operation, exceeds a predetermined threshold value, and the recording is started just after said interruption, with the recording power onto the optical disk just before it is interrupted. Further, by detecting the recording power, again, by reproducing an end portion just before the interruption, or by reducing the recording power determined, the recording is started just after that interruption thereof, with the said reduced recording power.

9 Claims, 3 Drawing Sheets

OPTICAL DISK APPARATUS METHOD FOR COMPENSATING RECORDING POWER FOR THE SAME

BACKGROUND OF THE INVENTION

The present invention relates to recording power compensation, in particular, in an optical disk apparatus, for recording/reproducing information onto/from an optical information recording medium, and in particular, it relates to a recording power compensating method applying a walking OPC (operating Power Control) therein and an optical disk apparatus applying the same therein, as a means for compensating the power recording (i.e., recoding compensation) during the recording operation, as well as, achieving high-speed recording of the optical disk.

In the optical disk apparatus for enabling to recode/reproduce information on the information recording surface of an optical disk, i.e., the optical information recording medium, the recording/reproducing of information onto/from the optical disk is achieved by irradiating a laser beam while rotating the optical disk at high speed, or by detecting the reflection light thereof. As a technology for achieving such recording compensation thereof while estimating the recording quality during when recording on the optical disk, conventionally, so-called a running OPC (herein after, being abbreviated "ROPC") is conducted, i.e., an estimation is made on a return light during the recording operation at a point B (B level), thereby to compensate the recording power upon the basis of deterioration or degradation of that B level.

However, as a means for treating a bending or curvature of the optical disk and/or fluctuations of sensitivity thereof, in that ROPC, as is already known inn the following Patent Documents 1 and 2, the recording is stopped or interrupted, when the recording power after making compensation through the said ROPC exceeds a predetermined value, so as to execute a tilt adjustment, and thereafter re-starting the recording operation. Also, in the following Patent Documents 3 is disclosed that, the recording compensation is conducted through ROPC, while conducting the tilt adjustment, every time when elapsing a certain time period, or every time when the recording operation progresses, elapsing a predetermined addressing sections.

[Patent Document 1] Japanese Patent Laying-Open No. 2004-234703 (2004);

[Patent Document 2] Japanese Patent Laying-Open No. 2005-4873 (2005); and

[Patent Document 3] Japanese Patent Laying-Open No. 2005-276248 (2005).

By the way, in recent years, accompanying with an increase of speed in recording operation for the optical disk, in particular, so-called a walking OPC (herein after, being abbreviated "WOPC") is applied, as a means for compensating or adjusting the recording power during that recording operation. Thus, with this WOPC, recording is interrupted or stopped at every predetermined interval on the optical disk, to reproduce an end portion of the recording, and thereby conducting the compensation of the recording power while estimating the recording quality.

On the other hand thereof, accompanying with wide spread of the optical disks, as an information recording medium, various optical disks are provided, differing in the kind (or type) and the functions thereof, and also in each of those optical disks, there can be sometimes found disks, being large in the fluctuation of sensitivity within that disk or in the bending or curvature in a part thereof. For this reason, it is difficult to maintain a sufficient recording quality for such the optical disks, only with the compensation of the recording power through such WOPC.

However, with such high-speed of recording mentioned above, also with the compensation of recording power through the conventional ROPC, it is difficult to detect the B level at high accuracy, and in addition thereto, as was mentioned above, the above WOPC comes to be a means for compensating the recording during the recording operation, and for that reason, there is necessity of combining the recording power compensation and the tilt adjustment suitable for that WOPC.

BRIEF SUMMARY OF THE INVENTION

Then, according to the present invention, by taking the problems of the conventional technologies mentioned above into the consideration thereof, in particular, it is an object of the present invention to provided a recording power compensating method, being suitable for the optical disk apparatus applying the WOPC as the means for compensating the recording power during the recording operation, and also an optical disk apparatus applying the same therein. Thus, with the recording power compensating method according to the present invention, it is possible to maintain the recording quality in the high-speed recording by combining the recording power compensation and the tilt adjustment.

For accomplishing the object mentioned above, according to the present invention, first of all, there is provided an optical disk apparatus, comprising: a disk motor, which is configure to drive an optical disk, rotationally; an optical pickup, which is configured to irradiate a laser beam upon an information recording surface of the optical disk, which is rotationally driven by said disk motor, to record data thereon, and to reproduce recorded data by detecting a signal from reflection light; a portion, which is configured to move said optical pickup into a radial direction of the optical disk, as well as, to control irradiation of the laser beam upon said optical disk; a portion, which is configured to control strength of the laser beam irradiated from said optical pickup; a detector, which is configured to detect a tilt condition of said optical pickup from the signal obtained from the light reflected upon said optical disk; a portion, which is configured to control a tilt angle of said optical pickup; and a controller, which is configured to control at least said laser beam strength control portion and said tilt angle control portion, thereby controlling recording power when recording information onto the optical disk by said laser beam strength control portion, wherein said recording operation is interrupted when satisfying a predetermined condition within a continuous recording operation, to determine the recording power when conducting the recording next, from the recording condition just before interruption, thereby starting the recording at the recording power determined just after said interruption, and said controller adjusts the tilt angle of said optical pickup by said tilt angle control portion, when said recording power determined when interrupting said recording operation exceeds a predetermined threshold value.

Further, according to the present invention, within the optical disk apparatus, as described in the above, preferably, said controller starts said recording just after interruption thereof, with the recording power onto the optical disk just before the interruption, in the place of said recording power that is determined, after adjusting the tilt angle of said optical pickup by said tilt angle control portion, or said controller starts said recording just after interruption thereof, with said recording power that is detected again through detecting the recording power again, after reproducing the end portion just before the interruption, in the place of said recording power that is determined, after adjusting the tilt angle of said optical pickup by said tilt angle control portion. Or, preferably, said controller starts the recording just after said interruption thereof, while reducing said recording power that is determined, after adjusting the tilt of said optical pickup by said tilt angle control portion, and in that instance, it is preferable that said controller reduces said recording power that is determined in accordance with an attenuation amount or a factor thereof, which is determined in advance, and in that instance, and in particular, said attenuation factor (0-1) is determined upon basis of the following equation:

attenuation factor=1−ΔTilt×α where, "ΔTilt" is an amount of difference from the tilt angle before adjustment, and "α" a compensation reflecting coefficient that may be obtained through an experiment.

In addition to the optical disk apparatus mentioned above, according to the present invention, also for accomplishing the object mentioned above, there is provided a method for compensating recording power, in an optical disk apparatus for recording data by irradiating a laser beam upon an information recording surface of an optical disk, which is driven rotationally, and reproducing data recorded by detecting a signal from a reflected light, as well as, while interrupting said recording operation when a predetermined condition is satisfied in continuous recording operation, the recording power is determined, for when conducting recording next, from a recording condition just before said interruption, thereby starting the recording with said recording power determined, just after said interruption thereof, comprising the following steps of: determining on whether said recording power, which is determined when interrupting said recording operation, exceeds a predetermined threshold value or not; adjusting a tilt angle of an optical pickup of said optical disk apparatus, as a result of said determination, if said recording power exceeds the predetermined threshold value, and thereby starting the recording just after said interruption thereof, with the recording power onto the optical disk just before the interruption thereof; and starting the recording with said recording power determined from just after said interruption thereof, as a result of said determination, if said recording power does not exceeds the predetermined threshold value.

Or, according to the present invention, also for accomplishing the object mentioned above, there is provided a method for compensating recording power, in an optical disk apparatus for recording data by irradiating a laser beam upon an information recording surface of an optical disk, which is driven rotationally, and reproducing data recorded by detecting a signal from a reflected light, as well as, while interrupting said recording operation when a predetermined condition is satisfied in continuous recording operation, the recording power is determined, for when conducting recording next, from a recording condition just before said interruption, thereby starting the recording with said recording power determined, just after said interruption thereof, comprising the following steps of: determining on whether said recording power, which is determined when interrupting said recording operation, exceeds a predetermined threshold value or not; adjusting a tilt angle of an optical pickup of said optical disk apparatus, and further detecting the recording power by reproducing an end portion just after the interruption thereof, as a result of said determination, if said recording power exceeds the predetermined threshold value, and thereby starting the recording just after said interruption thereof, with said recording power that is detected again; and starting the recording with said recording power determined from just after said interruption thereof, as a result of said determination, if said recording power does not exceeds the predetermined threshold value.

In addition thereto, according to the present invention, also for accomplishing the object mentioned above, there is provided a method for compensating recording power, in an optical disk apparatus for recording data by irradiating a laser beam upon an information recording surface of an optical disk, which is driven rotationally, and reproducing data recorded by detecting a signal from a reflected light, as well as, while interrupting said recording operation when a predetermined condition is satisfied in continuous recording operation, the recording power is determined, for when conducting recording next, from a recording condition just before said interruption, thereby starting the recording with said recording power determined, just after said interruption thereof, comprising the following steps of: determining on whether said recording power, which is determined when interrupting said recording operation, exceeds a predetermined threshold value or not; adjusting a tilt angle of an optical pickup of said optical disk apparatus, and further reducing said recording power that is determined, as a result of said determination, if said recording power exceeds the predetermined threshold value, and thereby starting the recording just after said interruption thereof, with said recording power that is detected again; and starting the recording with said recording power determined from just after said interruption thereof, as a result of said determination, if said recording power does not exceeds the predetermined threshold value.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 2:
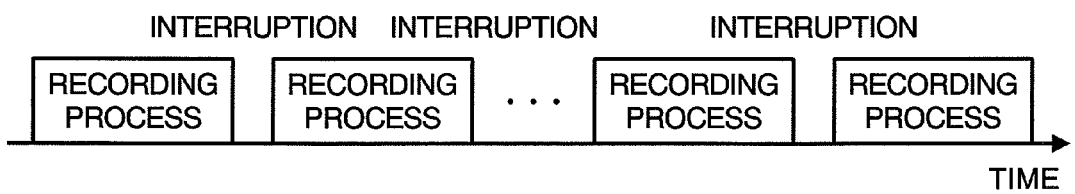
FIG. 2 is a view for briefly explaining the WOPC recording operation, to be executed within the optical disk apparatus mentioned above.

Firstly, FIG. 2 attached herewith is a block diagram for showing the inside structures of an optical disk apparatus, according to an embodiment of the present invention. In this figure, a disk motor rotation controller portion 1 inputs a control signal indicative of the motor rotation speed from a microcomputer 2, which builds up a controller portion for the entire of the apparatus, and thereby controlling driving current to be supplied in such a manner, through a motor current driver circuit not shown in the figure, that a disk motor 3 rotates at the rotation speed indicated with that control signal. In this manner, the disk motor 3 being controlled on the rotation speed thereof drives an optical disk 4, which is mounted on a turntable (not shown in the figure) attached on a tip of a rotation shaft thereof, and therefore it is possible to control the disk at an arbitrary rotation speed.

On the other hand, a laser power controller portion 5 controls laser driving current, through a drive circuit not shown in the figure, so that a power of a laser beam irradiated from a semiconductor laser, which is provided within an inside of an optical pickup 6, being installed movable into a radial direction of the optical disk through a moving mechanism, being made up with a slide motor, etc. (not shown in the figure), also comes up to be the power designated by the control signal from the microcomputer 2 mentioned above. However, this optical pickup 6 includes therein an object lens, etc., for condensing the laser beam onto an information recording surface of the optical disk 4 mentioned above, as well as, the semiconductor laser, i.e., a generating source of the above laser beam, and irradiates that laser beam of a predetermined strength onto the information recording surface of the optical disk 4; thereby achieving a desired recoding operation of information.

Also, inputting electric signals from the optical pickup 6 mentioned above, a servo controller circuit 7 extracts a signal (i.e., a tracking error signal) necessary for bringing the said optical pickup to follow a spiral groove (i.e., a track: in particular, in case of DVD, a land and a groove), which is formed on the information recording surface of the disk, and a signal (i.e., a focus error signal) necessary for controlling the focus of the laser beam, among the signals detected by means of the optical pickup 6, and thereby controlling the focus (Focus) of the optical pickup 6, while building up a control loop for obtaining the following operation (Tracking), upon basis of said tracking error signal and said focus error signal.

Further, adjusting a position of the object lens within the optical pickup 6 through control of driving current to a voice coil or the like (not shown in the figure), a tilt controller portion 8 in the figure controls a tilt angle, i.e., an inclination angle of the laser beam with respect to the information recording surface of the optical disk 4, at an arbitrary angle which is designated by the microcomputer 2 mentioned above.

In addition thereto, a RF EFM signal beta/modulation factor detector portion 9 detects beta (or "β") or the modulation factor of the RF EFM signal. This beta ("β") is a value that can be expressed by the following equation, while assuming that a peak level of the RF EFM signal obtained from the optical pickup 6 (i.e., a RF signal obtained through an AC coupling) is A1 and a bottom level thereof A2:

$$\text{Beta}(``\beta") = (A1 + A2)/(A1 - A2)$$

Thus, although explaining the details thereof herein after, but detection is made on the tilt condition of the above-mentioned optical pickup, upon basis of an output of this RF EFM signal beta/modulation factor detector portion 9, and the microcomputer 2 mentioned above controls the tilt angle.

And, an address information detector portion 10 detects a wobble (WOBBLE) signal from the electric signals obtained from the optical pickup 6 mentioned above. Thus, from the wobble (WOBBLE) of the land and the groove formed on the information recording surface of the optical disk, such as, DVD, etc., for example, detection is made on physical address information, such as, ADIP/ATIP, etc.

Figure 1:
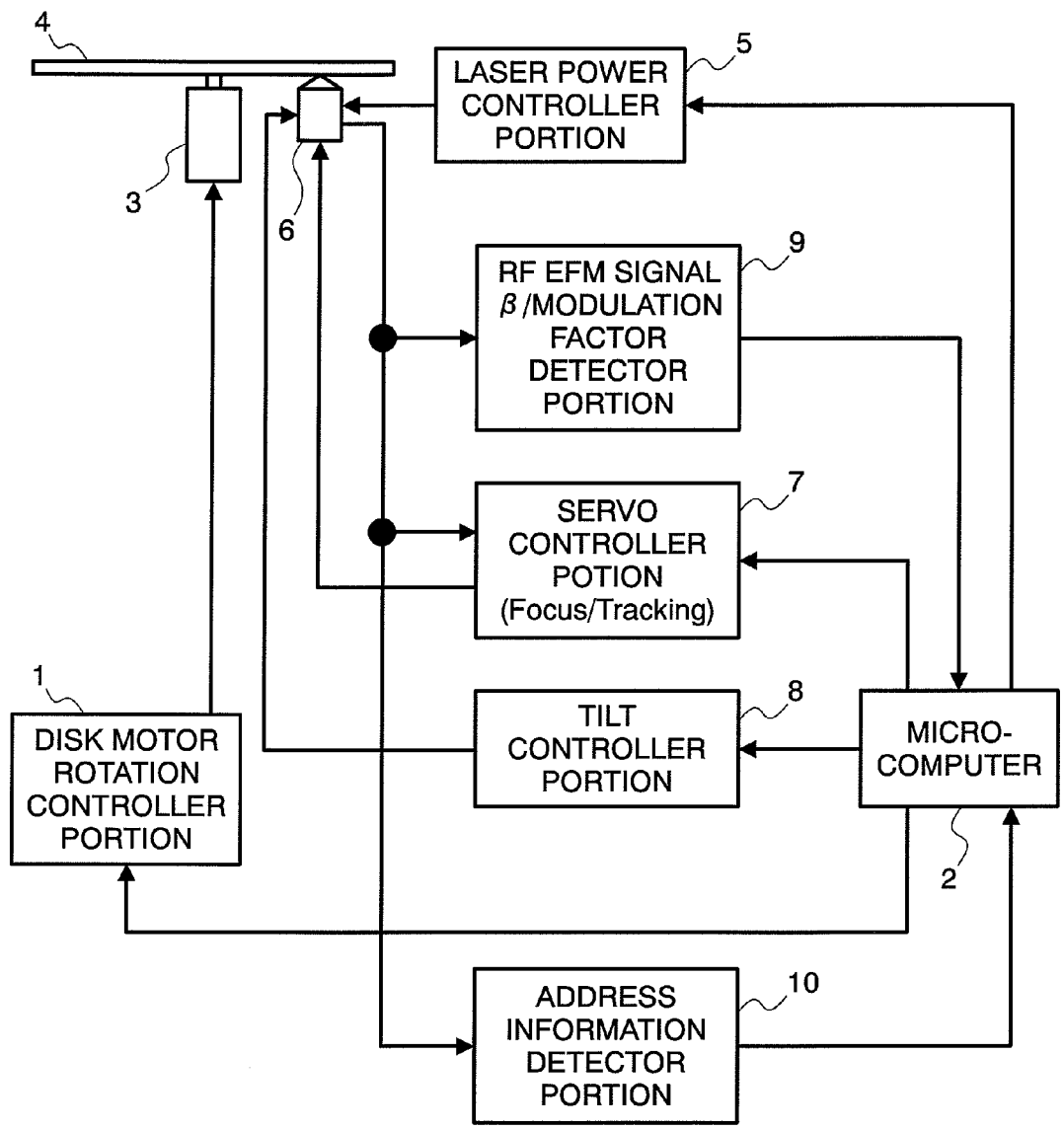
FIG. 1 is a block diagram for showing the inside structures of an optical disk apparatus, according to an embodiment of the present invention.

Following to the above, detailed explanation will be made on the WOPC operation within the optical disk apparatus, according to the one embodiment of the present invention, the inner structures of which was explained in the above, by referring to FIGS. 2 and 3 attached herewith. However, those processes are executed within the microcomputer 2 shown in FIG. 1, with an aid of software stored into a memory in advance.

First of all, within the optical disk apparatus mentioned above, the recording operation is started upon an instruction, such as, of data writing, or the like, from an outside thereof, for example, and in the instance, the recording is stopped or interrupted to reproduce an end portion of the recording, when a predetermined condition is established during the continuous recording operation, i.e., at every predetermined period on the optical disk, or when temperature change comes to be a certain amount, etc., in accordance with the WOPC within that recording operation, and thereby conducting the recording power compensation while estimating the recording quality thereof.

Firstly, as is shown in FIG. 2, when processing in the accordance with the WOPC, after recording a predetermined amount of data, continuously on the information recording surface of the optical disk, that recording operation is interrupted, so as to conduct the WOPC process; i.e., while measuring the recording condition just before the interruption, the recording power is determined for when conducting the recording, next, from the measurement result on this recording condition, and thereby re-starting the recording with the recording power that is determined, just after the interruption.

Though the recording process just after that is conducted with the recording power that is learned from the result of WOPC, in this manner, during the interruption of each of the recording processes, when processing the recording in accordance with the WOPC, but the details of which will be explained below. Thus, as is shown in FIG. 3 attached herewith, in each of the interruption processes in accordance with this WOPC, the process is started (S31) after recording the predetermined amount of data, continuously, on the information recording surface of the optical disk, as was mentioned in the above. Thereafter, position information (for example, the physical address information) is detected (S32), from the wobble (WOBBLE) signal detected by the address information detector portion 10, for example. Thereafter, determination is made upon an area or region (S33) where the WOPC should be practiced, and in more details thereof, in front thereof (or just before that), in the vicinity of the recording interruption area or region mentioned above. Thereafter, the compensation power of the laser beam for use in recording is calculated by executing that WOPC (S34). Thus, estimation is made on the end portion of recording area or region, and thereby calculating the compensation power.

Thereafter, within the ordinary recording process in accordance with the WOPC, the recording power, as an output of the laser beam for use of recording mention above, is changed to the compensation power, which is calculated in the step S34 mentioned above (S35), and thereby re-starting the recording process in the region just after the interruption (S36).

On the contrary thereto, with the recording power compensating method according to the present invention, it is further characterized with the following aspect. Thus, within the optical disk apparatus of conducting the WOPC, upon compensating the recording power through reproducing/estimating the recording end portion while stopping the recording, a tilt adjustment is practiced, in case when the recording power (Pn) after compensation exceeds a predetermined threshold value. Thus, there are many cases of coming off the tilt, when a laser power in accordance with the WOPC control exceeds a predetermined threshold value (Pth), which was determined in advance, and then, with the recording power compensating method according to the present invention, determination is made that the tilt comes off, and practice the adjustment of tilt, which will be shown herein after.

Figure 3:
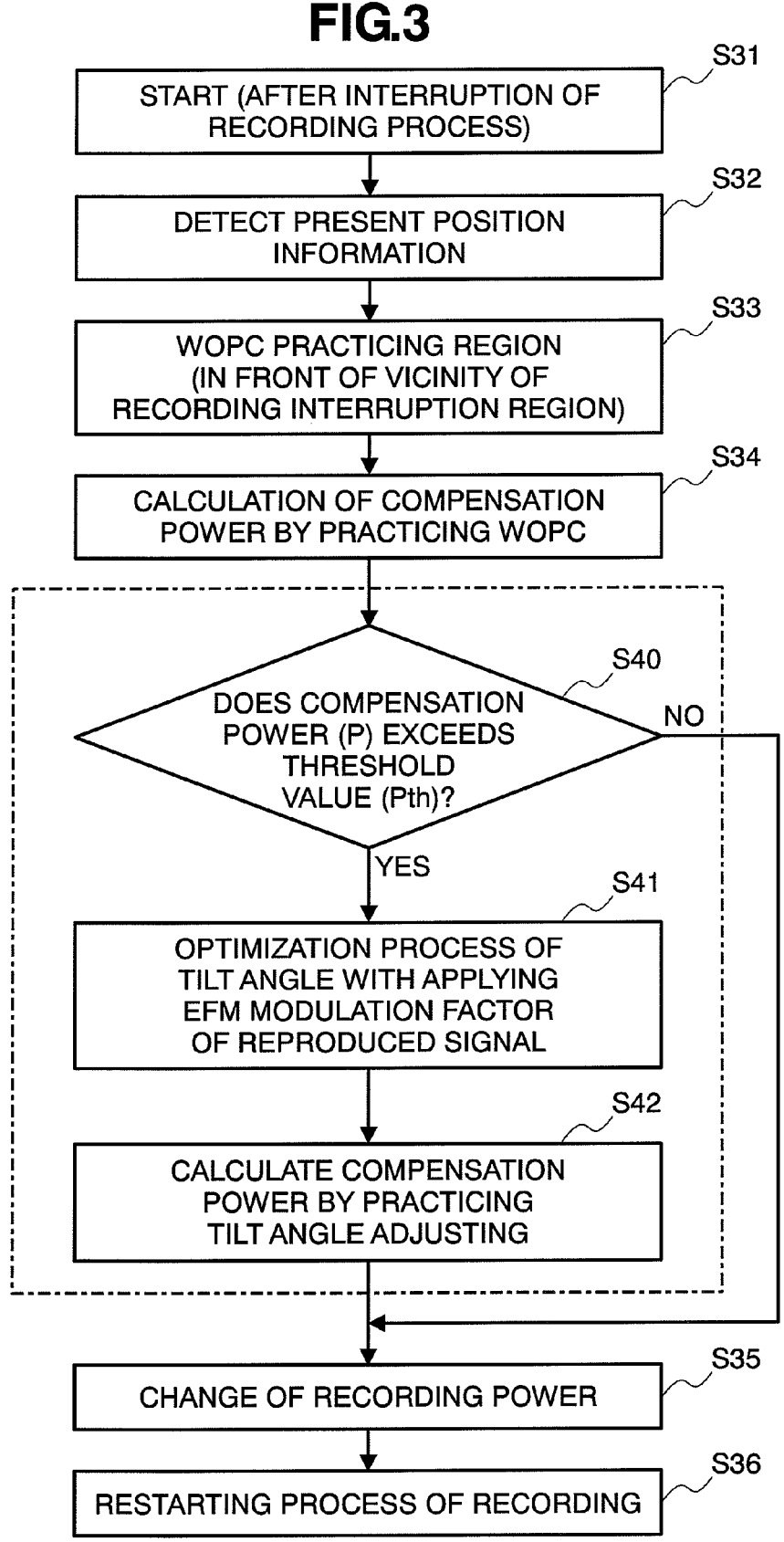
FIG. 3 is a flowchart for showing the details of the steps in the WOPC recording operation executed within the optical disk apparatus mentioned above.

Explaining in more details thereof, as is enclosed by one-dotted broken lines in the flow shown in FIG. 3 mentioned above, first, determination is made on whether the above-mentioned power (Pn) compensated exceeds the predetermined threshold value (Pth) or not (S40). As a result of that, in case when determining that the compensated power (Pn) does not exceeds the threshold value (Pth) ("No"), then the process changes the recording power, i.e., the output of the laser beam for use of recording, into the compensation power calculated in the step S34 mentioned above (S35), in the similar manner to that of the above-mentioned ordinary recording process with the WOPC, and thereby re-starting the recording process in the area or region just after that interruption (S36).

On the other hand, in case when determining that the compensated value (Pn) exceeds the threshold value ("Yes"), as the result of the above-mentioned determining process (S40), an adjusting process is executed on the tilt angle (i.e., an optimizing process) (S41).

In this tilt adjustment (i.e., the optimizing process) (S41), first of all, upon basis of the reproduction signal inputted from the optical pickup 6 mentioned above, the modulation factor or the beta ($\beta$) of the RF EFM signal is obtained from the RF EFM signal beta/modulation factor detector portion 9 mentioned above. Thus, detection is made on the recording condition (i.e., "$\beta$" or the modulation factor, etc.) within the recording region in front of (just before) the vicinity of the interruption position.

Figure 4A:
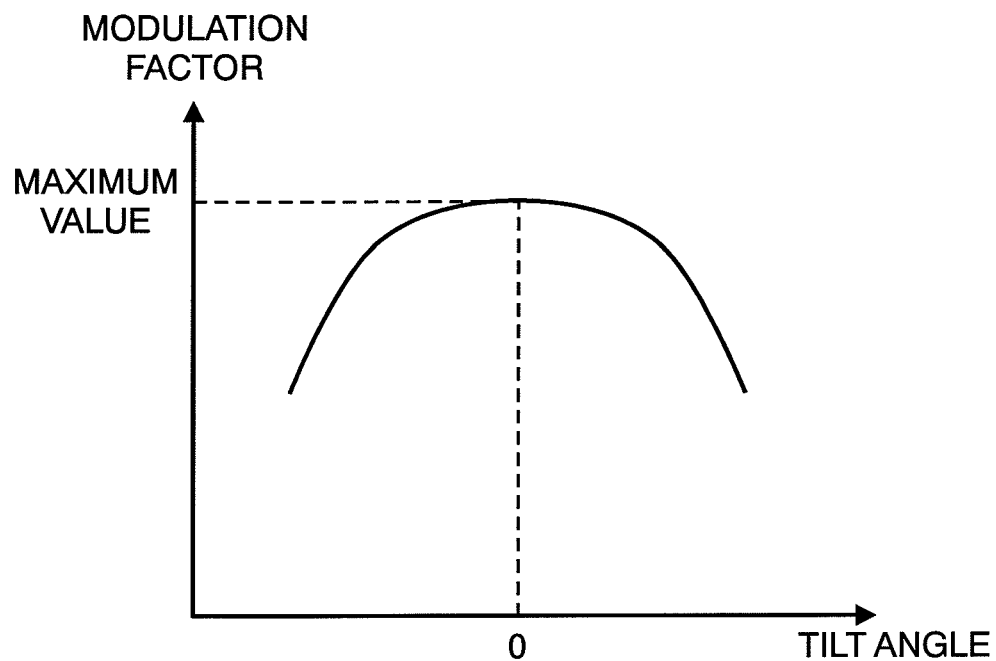
FIGS. 4(a) and 4(b) are views for showing the followings: i.e., a relationship between a tilt angle and a modulation factor of RF EFM signal, and a relationship between the tilt angle and beta (β), in the WOPC recording operation mentioned above, respectively.
Figure 4B:
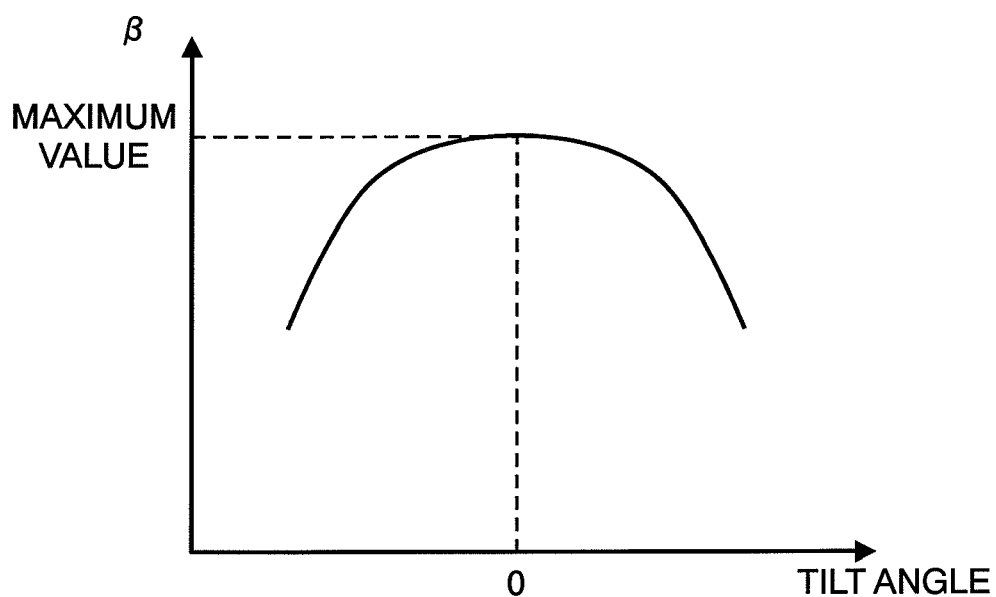

Herein, FIGS. 4(a) and 4(b) attached herewith are graphs for showing characteristics, each showing the relationship between the tilt angle and the modulation factor of the RF EFM signal, or the beta ($\beta$) thereof, wherein the horizontal axis shows the tilt angle while the vertical axis the modulation factor or the beta ($\beta$) of the RF EFM signal. As is shown in the figures, the RF EFM signal reached to the maximum when the tilt angle is zero (0), and the modulation factor or the beta ($\beta$) of the RF EFM signal decreases as the tilt angle is apart from zero (0). Accordingly, the tilt angle is adjusted by adjusting an angle of the optical pickup itself or the object lens thereof, so that the modulation factor of the RF EFM signal comes to the maximum value thereof.

In more details thereof, for the purpose of searching on the tilt angle when the information, i.e., the modulation factor or the beta ($\beta$), shows the maximum value, from the RF EFM signal beta/modulation factor detector portion 9, a search is made on the tilt angle, at which the modulation factor or the beta ($\beta$) comes to the maximum, while changing the tilt angle, actually, by means of the tilt controller means 8 mentioned above. And, recognizing the tilt angle bringing about the maximum by means of the RF EFM signal beta/modulation factor detector portion 9, the above-mentioned microcomputer 2 control the tilt angle through the tilt controller means 8, so that the modulation factor or the beta ($\beta$) comes to the maximum. However, this optimization of the tilt angle may be achieved by a method of using other detector means.

Further, after adjusting the tilt angle mentioned above, it is also possible to re-start the recording process in an area or region just after the interruption (S36), by conducting the change of the recording power mentioned above (i.e., the step S35 mentioned above); however, according to the present embodiment, the above change of the recording power (i.e., the step S35 mentioned above) and also the recording process in the area or region just after the interruption are re-started (S36), further after conducting the calculation of the compensation power (S42) by executing the compensation of tilt angle mentioned above.

Thus, thereafter, although the process is conducted for re-starting the recording process, but there is caused a possibility of recording a pit to be formed deeper than a desired value, if re-starting the recording at the recording power in the vicinity of the threshold value (Pth) mentioned above, in particular, under the condition that the tilt angle is controlled, correctly, in accordance with the compensation of the tilt angle mentioned above, within the optical disk apparatus. Then, with the recording power compensating method according to the present invention, within the calculation of the compensation power (S42) by executing the compensation mentioned above, the recording is re-started with using the tilt angle, being same to that before adjustment thereof, i.e., the recording power before the compensation, or alternately, it is re-started with a recording power, being lower than the recording power before compensation thereof, or the recording power obtained through the WOPC.

Thus, with the optimization of the tilt angle mentioned above, it is also possible to determine that the compensation is already unnecessary, upon the recording power obtained in accordance with the WOPC (namely, calculation of the compensation power in the step S34 mentioned above), and in that case, it is possible to re-start the recording at the recording power being equal to that when starting the recording. Or alternately, after executing the adjustment of the tilt angle within the optical disk apparatus mentioned above, it is also possible to re-start the recording after detecting an amount of compensating the recording power, while reproducing the end portion of the recording, again. Or, in the step for calculating the compensation power mentioned above, obtaining an amount or a ratio (between 0 and 1) of attenuation determined in advance, through an experiment in a laboratory, by taking temperature and the amount of tilt into the consideration, for example, in the place of that of mentioned above, it is also possible to calculate (i.e., subtraction or multiplication) this attenuation onto the compensation power, which is calculated in the step S34. For example, the above-mentioned attenuation factor can be determined upon the following equation 1, as an example:

$$\text{attenuation factor}(0-1) = 1 - \Delta\text{Tilt} \times \alpha \quad \text{(Eq. 1)}$$

where, "$\Delta$Tilt" is an amount of difference from the tilt angle before adjustment, and "$\alpha$" a compensation reflecting coefficient, being a coefficient that may be obtained through the experiment, etc.

As was mentioned in details in the above, according to the embodiment mentioned above of the present invention, with the optical disk apparatus enabling the WOPC recording operation therein, since the tilt adjustment is conducted in the vicinity of starting the recording, so as to re-start the recording with using a result of the tilt adjustment, in case when the recording power target value, which is learned as a result of WOPC, exceeds the threshold value, it is possible to prevent the recording power from increasing, in particular, exceeding a predetermined value, and also, to combine the recording power compensation and the tilt adjustment, as a recording compensation means in the WOPC, even for the optical disks difficult to maintain sufficient recording quality only with the compensation of the recording power in accordance with the WOPC, such as, the optical disks, etc., being large in the fluctuation of sensitivity within that disk or in the bending or curvature in a part thereof, and thereby enabling to maintain the sufficient recording quality in the high-speed recording.

According to the present invention mentioned above, there can be achieved a superior effect of providing a method for compensating the recording power, being suitable for the optical disk apparatus applying the WOPC, as a means for compensating the recording power during the recording operation, and enabling to maintain the recording quality in high-speed recording by combining the recording power compensation and the tilt adjustment, as well as, an optical disk apparatus with applying the same therein.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disk apparatus, comprising:
    a disk motor, which is configure to drive an optical disk, rotationally;
    an optical pickup, which is configured to irradiate a laser beam upon an information recording surface of the optical disk, which is rotationally driven by said disk motor, to record data thereon, and to reproduce recorded data by detecting a signal from reflection light;
    a portion, which is configured to move said optical pickup into a radial direction of the optical disk, as well as, to control irradiation of the laser beam upon said optical disk;
    a portion, which is configured to control strength of the laser beam irradiated from said optical pickup;
    a detector, which is configured to detect a tilt condition of said optical pickup from the signal obtained from the light reflected upon said optical disk;
    a portion, which is configured to control a tilt angle of said optical pickup; and
    a controller, which is configured to control at least said laser beam strength control portion and said tilt angle control portion, and thereby controlling recording power when recording information onto the optical disk by said laser beam strength control portion, wherein said recording operation is interrupted when satisfying a predetermined condition within a continuous recording operation, to determine the recording power when conducting the recording next, from the recording condition just before an interruption, and thereby starting the recording at the recording power determined just after said interruption, and
    said controller adjusts the tilt angle of said optical pickup by said tilt angle control portion, when said recording power determined when interrupting said recording operation exceeds a predetermined threshold value.

2. The optical disk apparatus, as described in the claim 1, wherein said controller starts said recording just after interruption thereof, with the recording power onto the optical disk just before the interruption, in the place of said recording power that is determined, after adjusting the tilt angle of said optical pickup by said tilt angle control portion.

3. The optical disk apparatus, as described in the claim 1, wherein said controller starts said recording just after interruption thereof, with said recording power that is detected again through detecting the recording power again, after reproducing the end portion just before the interruption, in the place of said recording power that is determined, after adjusting the tilt angle of said optical pickup by said tilt angle control portion.

4. The optical disk apparatus, as described in the claim 1, wherein said controller starts the recording just after said interruption thereof, while reducing said recording power that is determined, after adjusting the tilt of said optical pickup by said tilt angle control portion.

5. The optical disk apparatus, as described in the claim 4, wherein said controller reduces said recording power that is determined in accordance with an attenuation amount or a factor thereof, which is determined in advance.

6. The optical disk apparatus, as described in the claim 5, wherein said attenuation factor is determined upon basis of the following equation:

$$\text{attenuation factor} = 1 - \Delta \text{Tilt} \times \alpha$$

where, "$\Delta$Tilt" is an amount of difference from the tilt angle before adjustment, and "$\alpha$" a compensation reflecting coefficient that may be obtained through an experiment.

7. A method for compensating recording power, in an optical disk apparatus for recording data by irradiating a laser beam upon an information recording surface of an optical disk, which is driven rotationally, and reproducing data recorded by detecting a signal from a reflected light, as well as, while interrupting said recording operation when a predetermined condition is satisfied in continuous recording operation, the recording power is determined, for when conducting recording next, from a recording condition just before said interruption, thereby starting the recording with said recording power determined, just after said interruption thereof, comprising the following steps of:
    determining on whether said recording power, which is determined when interrupting said recording operation, exceeds a predetermined threshold value or not;
    adjusting a tilt angle of an optical pickup of said optical disk apparatus, as a result of said determination, if said recording power exceeds the predetermined threshold value, and thereby starting the recording just after said interruption thereof, with the recording power onto the optical disk just before the interruption thereof; and
    starting the recording with said recording power determined from that just after said interruption thereof, as a result of said determination, if said recording power does not exceeds the predetermined threshold value.

8. A method for compensating recording power, in an optical disk apparatus for recording data by irradiating a laser beam upon an information recording surface of an optical disk, which is driven rotationally, and reproducing data recorded by detecting a signal from a reflected light, as well as, while interrupting said recording operation when a predetermined condition is satisfied in continuous recording operation, the recording power is determined, for when conducting recording next, from a recording condition just before said interruption, thereby starting the recording with said recording power determined, just after said interruption thereof, comprising the following steps of:
    determining on whether said recording power, which is determined when interrupting said recording operation, exceeds a predetermined threshold value or not;
    adjusting a tilt angle of an optical pickup of said optical disk apparatus, and further detecting the recording power by reproducing an end portion just after the interruption thereof, as a result of said determination, if said recording power exceeds the predetermined threshold value, and thereby starting the recording just after said interruption thereof, with said recording power that is detected again; and starting the recording with said recording power determined from that just after said interruption thereof, as a result of said determination, if said recording power does not exceeds the predetermined threshold value.

9. A method for compensating recording power, in an optical disk apparatus for recording data by irradiating a laser beam upon an information recording surface of an optical disk, which is driven rotationally, and reproducing data recorded by detecting a signal from a reflected light, as well as, while interrupting said recording operation when a predetermined condition is satisfied in continuous recording operation, the recording power is determined, for when conducting recording next, from a recording condition just before said interruption, thereby starting the recording with said recording power determined, just after said interruption thereof, comprising the following steps of:

determining on whether said recording power, which is determined when interrupting said recording operation, exceeds a predetermined threshold value or not;

adjusting a tilt angle of an optical pickup of said optical disk apparatus, and further reducing said recording power that is determined, as a result of said determination, if said recording power exceeds the predetermined threshold value, and thereby starting the recording just after said interruption thereof, with said recording power that is detected again; and starting the recording with said recording power determined from that just after said interruption thereof, as a result of said determination, if said recording power does not exceeds the predetermined threshold value.

* * * * *